(12) United States Patent
Shen

(10) Patent No.: US 6,321,012 B1
(45) Date of Patent: Nov. 20, 2001

(54) OPTICAL FIBER HAVING WATER SWELLABLE MATERIAL FOR IDENTIFYING GROUPING OF FIBER GROUPS

(75) Inventor: Steven Xuefeng Shen, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/385,451

(22) Filed: Aug. 30, 1999

(51) Int. Cl.$^7$ ........................................ G02B 6/44
(52) U.S. Cl. ............................. 385/106; 385/112
(58) Field of Search ................... 385/103, 106, 385/108, 112, 113, 104

(56) References Cited

U.S. PATENT DOCUMENTS

| | | | |
|---|---|---|---|
| 3,789,099 | * 1/1974 | Garret et al. ............ | 264/174 |
| 4,158,746 | * 6/1979 | Taylor et al. ............ | 174/112 |
| 4,528,420 | * 7/1985 | Kish et al. .............. | 174/112 |
| 4,815,813 | 3/1989 | Arroyo et al. ........... | 385/102 |
| 4,909,592 | 3/1990 | Arroyo et al. ........... | 385/113 |
| 5,062,685 | 11/1991 | Cain et al. .............. | 385/114 |
| 5,071,221 | 12/1991 | Fujitani et al. .......... | 385/100 |
| 5,165,003 | 11/1992 | Carter .................... | 385/112 |
| 5,345,526 | * 9/1994 | Blew ..................... | 385/112 |
| 5,384,880 | * 1/1995 | Keller et al. ............ | 385/109 |
| 5,416,160 | 5/1995 | Johnson .................. | 385/109 |
| 5,621,838 | 4/1997 | Nomura et al. ........... | 385/100 |
| 5,649,041 | 7/1997 | Clyburn, III et al. ..... | 385/109 |
| 5,684,904 | 11/1997 | Bringuier et al. ........ | 385/109 |
| 5,751,879 | * 5/1998 | Graham et al. ........... | 385/103 |
| 5,761,361 | 6/1998 | Pfandl et al. ........... | 385/100 |
| 5,809,195 | 9/1998 | Brown et al. ............ | 385/114 |
| 6,052,502 | * 8/2000 | Coleman ................. | 385/114 |
| 6,088,499 | * 7/2000 | Newton et al. ........... | 385/112 |
| 6,122,427 | * 9/2000 | Yokokawa et al. ........ | 385/110 |

* cited by examiner

*Primary Examiner*—Ricky Mack
(74) *Attorney, Agent, or Firm*—Sughrue, Mion, Zinn, Macpeak & Seas, PLLC

(57) ABSTRACT

An improved optical fiber cable in which the threads that hold the various fiber groups together is made of a water swellable material and is color coded to allow the various fibers of the optical cable to be distinguished from each other. The optical fiber cable, includes a plurality of optical fiber groups, each groups including a plurality of optical fibers; a first water swellable material wrapped around a first group and a second water swellable material wrapped around a second group, wherein the first water swellable material has a color which is different from a color of the second water swellable material so as to allow optical fibers of the first group to be distinguished from optical fibers of the second group; and a sheath holding the plurality of optical fiber groups together. The optical fiber cable further includes a buffer tube in which the plurality of optical fiber groups are disposed arranged such that the sheath surrounds the buffer tube. The optical fibers of the first group have different colors and the optical fibers of the second group have different colors. However, the colors of the optical fibers of the first group are the same as the colors of the optical fibers of the second group. Thus, according to the present invention, it is possible to distinguish between optical fibers having the same color by the manner in which the optical fibers are grouped by the colored water swellable material. Further, instead of using a gel for waterproofing the groups of optical fibers, a water swellable material may be used which is wrapped around the optical fiber groups. Finally, the colored water swellable materials can also be used to form super group units in a cable and to block the ingress of water along the cable core.

18 Claims, 2 Drawing Sheets

OPTICAL FIBER HAVING WATER SWELLABLE MATERIAL FOR IDENTIFYING GROUPING OF FIBER GROUPS

BACKGROUND OF THE INVENTION

1. Field of the Invention

The present invention relates to an optical fiber communication cable in which the optical fibers and/or ribbons are bound and assorted into groups by using water swellable material having indicia (e.g., different colors, color strips/prints and/or simply mono-color strips/prints) to distinguish the groups.

2. Discussion of Related Art

Conventional optical fiber cables include optical fibers that are sometimes grouped together in sets (with each set having one or more, e.g., twelve, optical fibers) with each fiber in a particular set having a unique color. Thus, within a single set, the optical fibers are coated with distinctly different colors. These distinct colors are repetitively used for each set, so that if there are three sets of optical fibers, the optical fiber cable will have, e.g., three red optical fibers, three green optical fibers, etc. In order to distinguish between optical fibers having the same color, it is necessary to color code each set of optical fibers. To accomplish this, the optical fiber sets are wrapped by different colored binder threads such that, e.g., a first set is held together by a blue binder thread, a second set is held together by a yellow binder thread and a third set is held together by an orange binder thread, and so on and so forth. In this way, one can identify the optical fibers by the specific color of the optical fiber and the associated color of the optical fiber set, e.g. red optical fiber of the blue optical fiber set or the green optical fiber of the yellow optical fiber set. This arrangement is illustrated in FIGS. 1 and 2 showing an optical fiber cable 10 having four optical fiber sets 12 respectively held together by colored binder threads 14. The optical fiber sets 12 are enclosed in a buffer tube 16 and a water block gel 18 is filled in the space defined between the optical fibers. The buffer tubes are then encapsulated by an outer sheath 20 having rigid strengthening members 22.

Although not shown, it is also known to wrap the optical fiber ribbons or tubes with a water swellable material to prevent moisture from adversely affecting the optical fiber, as disclosed in U.S. Pat. No. 5,384,880.

The problem with this arrangement is that with higher and higher buffering process speeds, the gel feeding could become the bottleneck of the process. The higher buffering line speed may induce problems due to the gel not being able to fill the buffer tube, which will result in the formation of air bubbles or voids in the gel thus inhibiting the water block capacity of the gel. Also, an excessively high gel feeding speed imposes high shear stress on the gel which can potentially decompose the gel. In turn, the decomposed gel may yield compound flow failure or water penetration failure issues in the cable. The gel properties effected by the high shear stress can cause process instability and make the overall process of manufacturing the optical cable complex.

More importantly, due to the presence of the water block gel, it is inconvenient and messy to access the fibers in field applications and the exposed gel may also become a source of environmental hazard.

SUMMARY OF THE INVENTION

An object of the present invention is to simplify the overall structure of the optical fiber cable and the associated method of manufacturing the cable and to provide a cable which is more user and environmentally friendly.

According to the present invention, there is provided an optical fiber cable, comprising a plurality of optical fiber groups or sets, each groups including a plurality of optical fibers; a first water swellable material disposed around a first group of optical fibers in a continuous or intermittent manner to hold the fibers together throughout the length of the fibers and a second water swellable material similarly disposed around a second group of optical fibers, wherein the first water swellable material has a color (or other indicia) which is different from a color (or other indicia) of the second water swellable material so as to allow optical fibers of the first group to be distinguished from optical fibers of the second group; and, in some instances a sheath holding the plurality of optical fiber groups together.

The optical fiber cable may further comprise buffer tubes in which the plurality of optical fiber groups or sets are respectively disposed and the buffer tubes are surrounded by the sheath. The optical fibers of the first group have different colors as do the optical fibers of the second group. However, the colors of the optical fibers of the first group are, in some instances, the same as the colors of the optical fibers of the second group. According to the present invention, it is possible to distinguish between optical fibers having the same color by the manner in which the optical fibers are grouped by the colored water swellable material and/or component.

According to another aspect of the invention, the filling gels are replaced with a water swellable material to achieve water block protection of the optical fibers. For example, water swellable material could be used to wrap all the various groups together, and possibly, act as a substitute for the buffer tubes.

DETAILED DESCRIPTION OF THE INVENTION

The present invention will be explained further in detail by making reference to the accompanying drawings, which do not limit the scope of the invention in any way.

Figure 3:
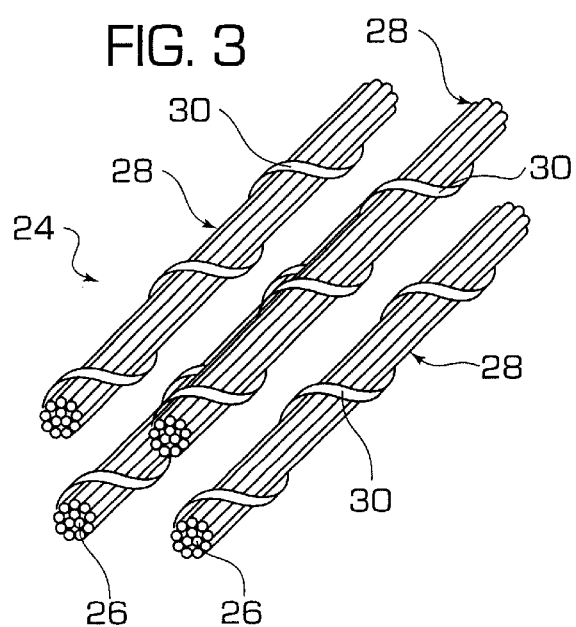
FIG. 3 is a perspective view of the optical fiber groups according to the present invention.

Referring to FIG. 3, the optical fiber cable 24 includes a plurality of optical fibers 26 that are grouped together in, e.g., sets of twelves as optical fiber groups 28. As noted above, the colors of the optical fibers within a particular group are different, but the colors of the optical fibers overlap in the respective groups. For example, each group has a red optical fiber, a green optical fiber, etc. In order to distinguish between the optical fibers of the various groups, the groups 28 are individually wrapped with binder threads 30 having different colors. According to the invention, the binder threads 30 are made of conventional water swellable material, such as those disclosed in U.S. Pat. No. 4,815,813 (which is incorporated herein by reference), which are colored using pigments, dyes (both reactive or non-reactive), etc. The water swellable material may be a polyester, aramid or other material in the form of yarn, tape, fabric, powder or foam. Suppliers of such material include, but are not limited to Gegatape, Lantor, Neptco, Akzo and DuPont.

Thus, an important difference between the conventional arrangement discussed above and the present invention is that the binder threads 30 according to the present invention are made of a water swellable material which is colored. In the event of water ingress, the water is absorbed and blocked by the threads 30 so that the optical fibers are not adversely affected.

It is of course understood that rather than coloring the binder threads 30 as a way to distinguish the optical fibers, the binder threads 30 may have some other form of indicia as a way of distinguishing the optical fibers. For example, a numeral or letter system could be used where the binder threads are sequentially numbered, such as with numbers 1, 2, 3, etc, or sequentially lettered, such as with letters A, B, C, etc. Alternatively, the binder threads can have stripes with different colors or varying in number (i.e., one stripe, two stripes, three stripes, etc.).

Figure 1:
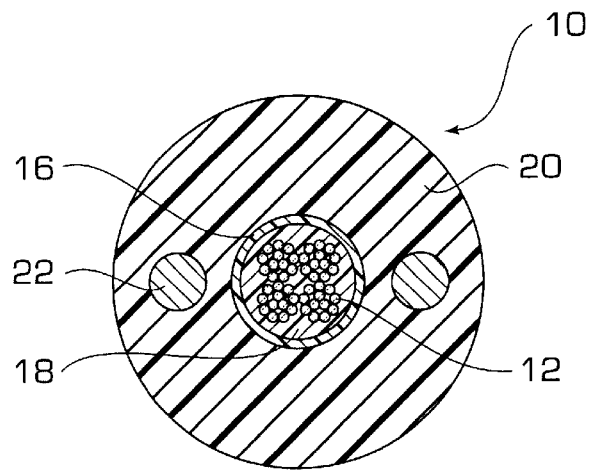
FIG. 1 is a sectional view showing a convention optical fiber cable.
Figure 2:
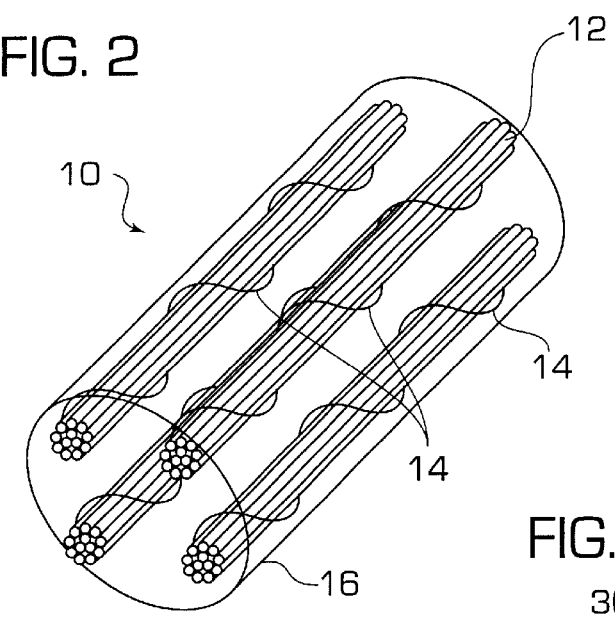
FIG. 2 is a perspective view of the conventional optical fiber cable of FIG. 1.

According to one embodiment of the invention, the water swellable threads 30 are wound in a helical manner, as shown in FIG. 3. The threads 30 can be wrapped in either a single direction or in two directions 180° opposite each other (not shown). As in the conventional arrangement shown in FIG. 1, the optical fiber groups 12 may be disposed inside a buffer tube 16 which is surrounded by an outer sheath 20 reinforced with diametrically opposed strengthening members 22 extending longitudinally of the cable. Although not necessary, a water blocking gel 18 may be introduced into the buffer tube 16, like that discussed above.

Other possibilities include the following:

Apply water swellable powder to the optical fiber sets and then individually wrap the fiber sets with colored water swellable tape or yarn;

Wrap colored water swellable yarns or tapes around tube sets to group and identify the tube sets; or Wrap colored water swellable yarns or tapes around optical fiber ribbon sets to group and identify the ribbon sets; or Wrap colored water swellable yarns or tapes around buffer tubes to group and identify the tube sets; or Wrap colored water swellable yarns or tapes around fiber sub-sets (grouped and identified by water swellable tape or yarn) to form and identify the fiber super-sets or groups.

Apply colored water swellable yarns or tapes in combination with non-colored water swellable materials and/or components and non-water-swellable materials and/or components.

Or course it is understood that the invention is not limited to any particular arrangement and is intended to cover various combinations of the above.

Thus, the present invention provides an improvement over the conventional design in that the color coded binder threads 30 perform three important functions, namely, holding the optical fibers in discrete groups or sets, providing a means for distinguishing between optical fibers of different groups having the same color combination, and water-proofing the optical fibers of each fiber group or set. Because of this latter feature, it is possible to eliminate the gel.

Figure 4:
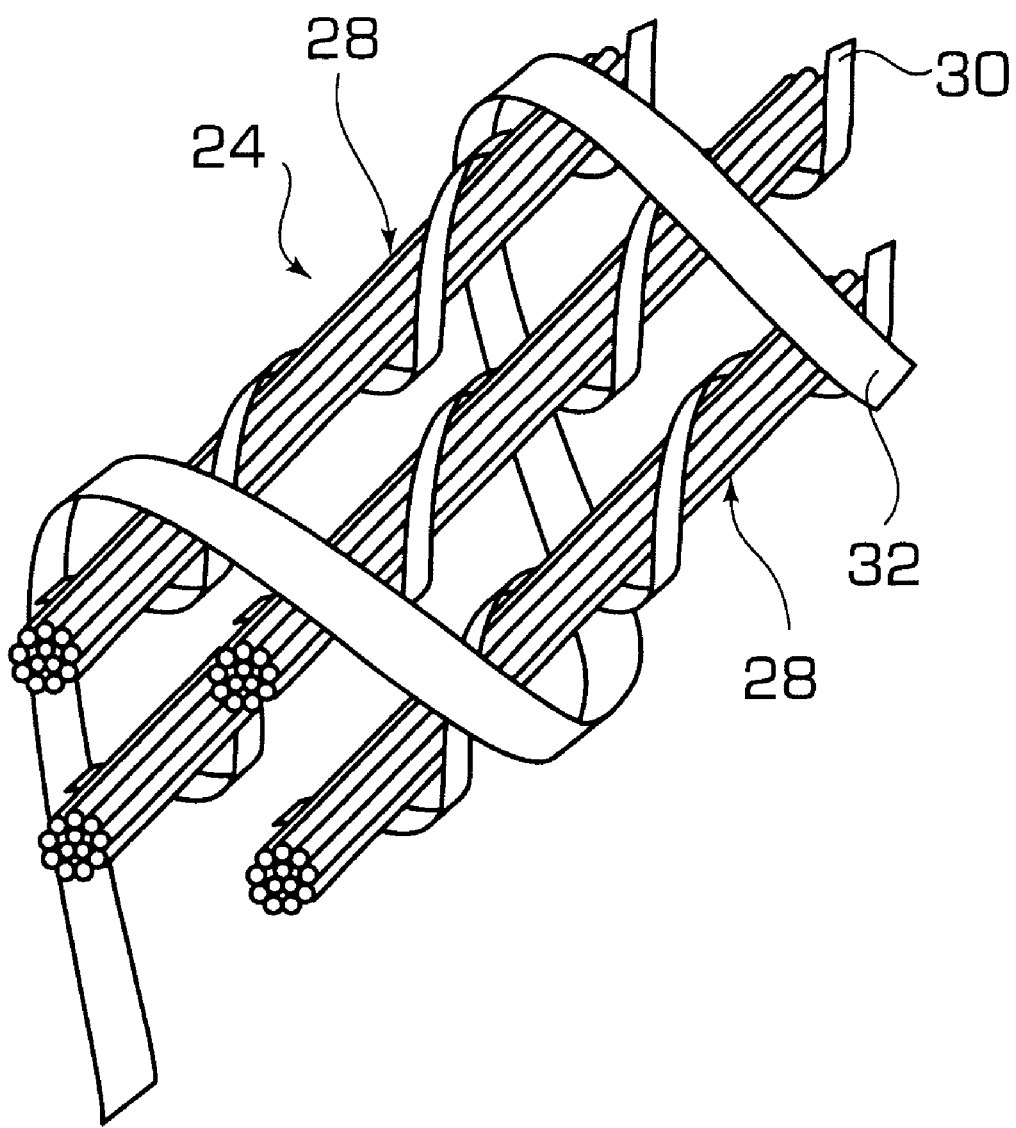
FIG. 4 is a sectional view showing the optical fiber cable according to a second aspect of the present invention.

According to another embodiment of the invention, water swellable material 32 may be used as a substitute for the gel 18, discussed above. In particular, as shown in FIG. 4, water swellable material 32 is wrapped around all of the optical fiber groups to hold them together and provide further water-proofing. In this case, the water swellable material may also act as a substitute for the buffer tubes 16. This design, with the elimination of the gel, provide improved access to the optical fibers in field applications. In addition, the completely dry design eliminates the gel contamination to the environment. Of course, there are many other alternative wrapping techniques that may be used. For example, one of many alternatives is to wrap a continuous sheet around the optical fiber groups like a tube wrap.

In addition, the water swellable material may be used to hold the groups in various sub-groups. For example, each group may be divided into sub-groups of optical fibers. For example, if the cable includes six optical fiber bundles, the bundles can be held in two optical fiber groups with each group containing three sub-groups of optical fibers that are held together by wrapping the water swellable material around the sub-groups.

The optical fiber cable may be manufactured in the following manner involving three primary steps. In the first step, the fibers and colored water swellable yarn/tape are paid off together during the buffering process (in the case of ribbon, the fibers are first laterally arranged parallel to one another and coated with a polymer matrix material to form a fiber ribbon group). Specifically, the fibers are paid off from a fiber tree and the water swellable yarns from a binder machine (in case of tapes, a forming process and tape pay-off will be required). By passing the binder heads, the fibers can be divided into sub-groups and grouped/identified in sets by the colored water swellable yarns, which surround the divided fiber sets. Plastic material is then extruded into a buffer tube in such a manner that the fibers are enclosed by the tube. In a similar fashion, the fibers and colored water swellable yarns can be wrapped by a colored water swellable tape as a substitute for the buffer tubes. In latter case, binders (which can be made of water swellable material) may be needed to keep the colored water swellable tapes enclosed around fibers (as an alternative is to using glues).

The second step of the cabling process involves stranding the buffer tubes or fiber groups or sets (encapsulated by colored WS tape or yarn) together into an optical fiber cable core. Again, in this step of the process, fiber groups or sets can be grouped into super-group units by colored water swellable materials. Thus, one may have multiple stranding passes. Finally, in a jacketing step, the cable core is paid off and a polyethylene sheath is extruded around the core to make the cable. Various strengthening members can be applied during this jacketing step. Since it is not necessary to feed gel during the process (see FIG. 4), the line speed is only limited by the extrusion. Thus, the previously mentioned complexity due to the gel filling process can be completely eliminated.

Thus, the use of colored binder threads, including water swellable material, in optical fiber cables represents a significant improvement over convention designs in that the cable is relatively easy to manufacture with improved water-proofing of the optical fibers. The swellable material may be used as a substitute for the gel to provide an optical cable that is entirely dry, thereby improving the ability to access the optical fibers in the field without the risk of contamination to the environment.

It is of course understood that departures can be made from the preferred embodiments of the invention by those of ordinary skill in the art without departing from the spirit and scope of the invention that is limited only by the following claims.

I claim:

1. An optical fiber cable, comprising:

a plurality of optical fiber groups, each group including a plurality of optical fibers; and a first binding component disposed at least partially around a first group of said plurality of groups and a second binding component disposed at least partially around a second group of said plurality of groups, wherein said first and second binding components have distinguishing indicia thereon so as to allow optical fibers of said first group to be distinguished from optical fibers of said second group, and wherein at least one of said first and second binding components is made of water-swellable material.

2. The optical fiber cable of claim 1, further comprising a sheath holding said plurality of optical fiber groups together.

3. The optical fiber cable of claim 2, further comprising a buffer tube in which said plurality of optical fiber groups are disposed, said sheath surrounding said buffer tube.

4. The optical fiber cable of claim 3, wherein said optical fibers of said first group have different colors.

5. The optical fiber cable of claim 4, wherein said optical fibers of said second group have different colors.

6. The optical fiber cable of claim 5, where the colors of said optical fibers of said first group are the same as the colors of the optical fibers of said second group.

7. The optical fiber cable of claim 6, further comprising a gel provided inside said buffer tube and between said first and second groups.

8. The optical fiber cable of claim 1, wherein said distinguishing indicia is different colors.

9. The optical fiber cable of claim 1, wherein each of said optical fiber groups includes a plurality of subgroups of said optical fibers.

10. The optical fiber cable of claim 1, wherein said binding components include colored and non-colored water swellable material.

11. The optical fiber of claim 1, wherein said optical fibers are waterproofed without the presence of a gel in said optical fiber cable.

12. The optical fiber cable of claim 11, wherein said first and second binding components are made of a water swellable material.

13. The optical fiber cable of claim 11, further comprising a buffer tube in which said plurality of optical fiber groups are disposed.

14. The optical fiber cable of claim 11, wherein said optical fibers of said first group have different colors.

15. The optical fiber cable of claim 14, wherein said optical fibers of said second group have different colors.

16. The optical fiber cable of claim 15, where the colors of said optical fibers of said first group are the same as the colors of the optical fibers of said second group.

17. An optical fiber cable, comprising:

a plurality of optical fiber groups, each group including a plurality of optical fibers; and a first binding component disposed at least partially around a first group of said plurality of groups and a second binding component disposed at least partially around a second group of said plurality of groups, wherein at least one of said first and second binding components is made of water-swellable material.

18. An optical fiber cable, comprising:

a plurality of optical fiber groups, each group including a plurality of optical fibers; and a first binding component disposed at least partially around a first group of said plurality of groups and a second binding component disposed at least partially around a second group of said plurality of groups, wherein said first and second binding components have distinguishing indicia thereon so as to allow optical fibers of said first group to be distinguished from optical fibers of said second group; and a third binding component disposed at least partially around at least one of said first and second groups, wherein said third binding component is made of water-swellable material.

* * * * *